ADAPTER FOR PHONOGRAPH RECORDS

Filed May 22, 1951 2 Sheets-Sheet 1

INVENTOR.
Colin B. Dale
BY
Banning & Banning
Attys:

INVENTOR.
Colin B. Dale
BY Banning & Banning
Attys.

Patented Jan. 19, 1954 2,666,647

UNITED STATES PATENT OFFICE 2,666,647

ADAPTER FOR PHONOGRAPH RECORDS

Colin B. Dale, Oak Park, Ill., assignor to Webster-Chicago Corporation, Chicago, Ill., a corporation of Illinois Application May 22, 1951, Serial No. 227,606

6 Claims. (Cl. 274—10)

Manufacturers of phonographs have been confronted in recent years with new problems arising from the production of disc records having different diameters some of which are playable at special speeds which are different from that of the others. To provide automatic record changers in connection with such phonographs has proved an even greater problem. In recent time certain records with oversize center holes (about 1½″ diameter) have also been introduced upon the market, adapted for play only by phonographs having turntables with relatively large center spindles of substantially corresponding diameter. It is not possible to play such records upon a phonograph which is equipped with the heretofore standard turntable spindle of relatively small diameter (about $\frac{9}{32}$″ diameter) designed for use with a very large proportion of the records as made in the past. Such a condition is both costly and unsatisfactory for the owners of standard phonographs who may wish to play thereon the newer records which have oversize center holes.

At present the records which have oversize center holes may be played on the conventional phonograph, but only if adapters therefor be provided with center holes corresponding in size to those of ordinary spindles. Such an insert must be installed fixedly in place to assure concentricity of the record when placed upon the turntable. Furthermore, the operation of installing any such insert involves some effort as does also its removal. Each such operation is usually damaging to the record hole so that, in time, the record may be rendered unfit for further use. Also the owner of an extensive library of records will have to be equipped with many such inserts, involving a substantial outlay and considerable effort in their installation. These are some of the shortcomings of the attempted solution of the problem with which I am here concerned.

According to the present invention, no insert is needed to adapt a record having an oversize center hole for play upon a phonograph which is equipped with the conventional spindle of relatively small diameter. Instead, provision is made, as will shortly appear, for utilizing the existing record changing mechanism of a conventional phonograph having the usual small diameter spindle to operate with records having oversize holes. This is accomplished by providing an adapter of two units, each of which may be loosely placed in its operative position and be removed therefrom without any effort whatsoever. One of these units rests upon the turntable in surrounding relation to the spindle, and the other unit is seated over the pilot at the spindle top to rest upon a shoulder that is offset therefrom to provide support for a stack of records in reserve. These two units coact with a standard record changing mechanism to (1) position the reserve records operatively with respect thereto, and (2) guide each released record to a playing position which is concentric with the axis of the turntable. The present invention is concerned primarily with the unit which is fitted upon the pilot at the spindle top to coact with the record release mechanism to release the records in reserve, one at a time, to playing position upon the turntable.

A simple form of two-unit adapter embodying the features of this invention is illustrated in the accompanying drawing in the following manner:

Figure 1 is a fragmentary vertical section axially of a phonograph turntable, showing in elevation a conventional spindle of relatively small diameter which, in its upper portion, is provided with an offset pilot;

Fig. 2 which is a similar view shows the two-unit adapter of this invention applied to the turntable and spindle of Figure 1;

Figures 6, 7, 8, 9, 10, 11:
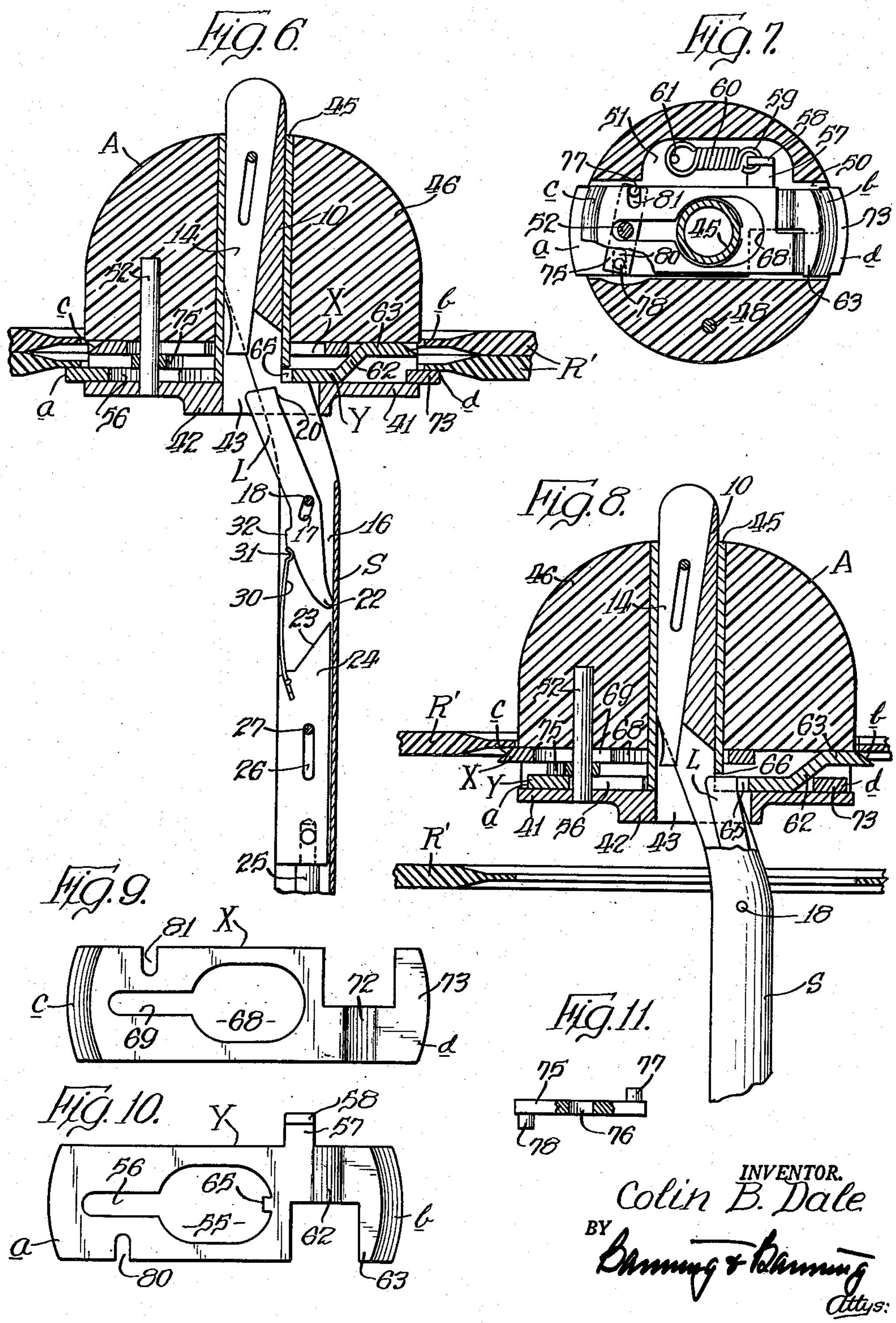
Fig. 6 is a vertical section through the upper adapter unit on a somewhat enlarged scale, showing a typical record release mechanism accommodated within a conventional spindle of relatively small diameter, the parts of such mechanism being in the normal rest position.
Fig. 7 is a transverse section through the adapter, taken on line 7—7 of Fig. 2.

Fig. 8 which is a view similar to Fig. 6 shows the spindle release mechanism operated to actuate the record release mechanism in the upper adapter unit for release of the lowermost record therefrom and for simultaneous support of the record stack thereabove;

Fig. 9 is a top plan view of the upper slide plate comprised in the record release mechanism of the upper adapter unit;

Fig. 10 is a similar view of the lower slide plate; and

Fig. 11 is a side elevation of the pivoted cross bar which interconnects the two slide plates.

The phonograph herein shown comprises a turntable T rotatable about a fixed upstanding axial spindle S which is provided in its upper end portion with an offset pilot 10 rising from a norrow neck 11 which joins with a record supporting shoulder 12 therebelow. It is unimportant whether the spindle be straight up to the level of its shoulder, or be formed with an inclination, as shown, whereby the pilot is positioned eccentrically of the turntable axis but with its axis parallel therewith, both types of spindles being common at the present time. The diameter of such a spindle and its pilot is relatively small, perhaps about $\frac{9}{32}$''. This diameter has been chosen with reference to that of the center holes which have commonly been provided in disc records of the past and present.

When a supply of records R is fitted over the pilot, the shoulder 12 will afford a rest for the lowermost record to prevent its further descent along its spindle unless the record be first shifted laterally toward the free edge of the shoulder. When so shifted, the lowermost record is freed for supporting engagement with the shoulder so as to descend by gravity along the spindle to playing position upon the turntable. Means in the form of a vertically sliding latch 14 are also carried by the pilot, within an endwise slot therein, and at a lowermost elevation which clears the lower end of the latch from only the lowermost record R when resting on the shoulder 12. Lateral shifting movement of any record within the record stack, except only the one which is lowermost, is thereby prevented, thus assuring a release of but one record at a time. Successive records which are to be dropped onto the turntable combine to form a stack thereon, the one which is uppermost being in playing position relative to the transducer of the tone arm.

The record release mechanism, as herein shown, comprises a kicker in the form of a rocking lever L (see Fig. 6) which is accommodated within a slot 16 that is extended longitudinally of the spindle. This lever is formed with an elongated slot 17 through which is extended a cross pin 18 that is anchored in the spindle, the lever being thereby supported for pivotal and sliding movements. At its upper end the lever is formed with a push-off head 20 which is normally disposed close to the axis of the pilot 10 and at a level which is just below the shoulder 12.

Figure 1:
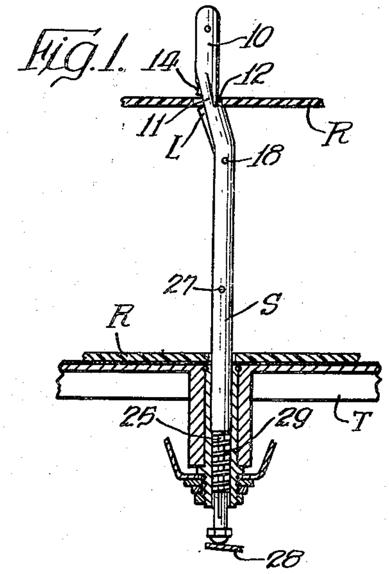

The lower end of the lever terminates in a nose 22 engageable by a cam face 23 at the upper end of a slidable head 24 which is connected at its lower end to a push rod 25 that extends axially through the spindle downwardly beyond its lower end. This head is formed with an elongated vertical slot 26 through which extends a cross pin 27 that is anchored in the spindle, the head being thereby confined to straight line vertical movements in response to like movements of the rod. An actuator 28 (see Fig. 1) forming part of the record changing mechanism below the turntable is operated periodically to raise the push rod against the tension of a spring 29, thereby to rock the lever L in the manner hereinafter noted.

Extending upwardly from the slidable head 24 is a leaf spring 30 having a head 31 in engagement with a boss 32 that is protruded from the adjacent face of the lever. In the position of Figure 6 the spring head 31 underlies the boss but, in response to upward movement of the slide, the spring is caused to ride outwardly and upwardly along the boss; in this movement the lever is also raised and, in response to engagement of the head cam face 23 with the nose 22, the lever is rocked as well so as to advance to the position of Fig. 8. A return downward movement of the push rod 25, responsive to tension of the compression spring 29, is accompanied by a gravity drop of the lever L and its concurrent rocking back to the rest position of Fig. 6. In this cyclic movement of the lever, its push-off head 20 is first raised and rocked laterally to displace the lowermost record R from the shoulder 12, thus freeing the record for gravity descent along the spindle to playing position upon the turntable T; the push-off head 20 also advances to a position of support beneath the reserve records above the lowermost one that is released to the turntable, and then drops therewith to the extent permitted by the pin 18 within the slot 17. The lowermost reserve record will then be rested upon the spindle shoulder 12 to await the next cyclic operation of the release mechanism as per the description just given.

The record release mechanism incorporated within the phonograph spindle, as described up to this point, is one that is already known and in widespread use. Another such mechanism is that which is disclosed in the patent to Butler, No. 2,328,052, dated August 31, 1943. The release mechanism in each case is characterized by a rocking lever which is accommodated within a slot extending lengthwise of the spindle, and the lever is provided with a push-off head that is movable transversely of the spindle to displace the lowermost reserve record from its position of rest upon the supporting shoulder whereby it is released for gravity descent to playing position upon the turntable. No problem is involved so long as use is made of records R having center holes which correspond in size closely with the diameter of the spindle S, but with other records R', having oversize center holes, such a spindle and record release mechanism is wholly inoperable.

The features of invention now to be described are concerned with an adapter, applicable to such a spindle S, whereby to render it usable with records R' having oversize holes. Such an adapter also combines in itself certain release mechanism for records having oversize holes, and operable by the release mechanism of the spindle to which the adapter is fitted. The power which operates the kick-off lever of such a small diameter spindle is transmitted therefrom to the adapter release mechanism for operation thereof, as will presently be made plain.

Figure 2:
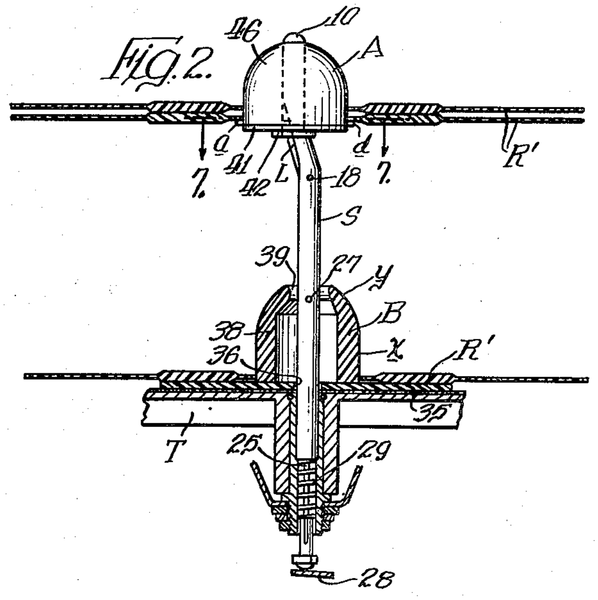
Figure 3:
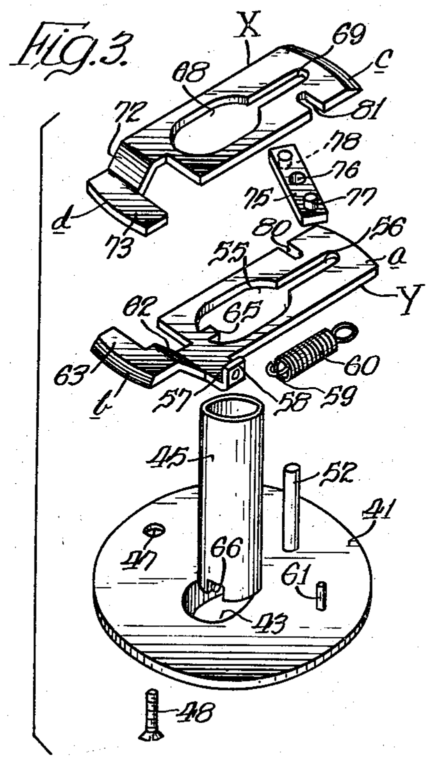
Fig. 3 is an exploded view in perspective of the record release mechanism which is carried by the upper adapter unit.
Figure 4:
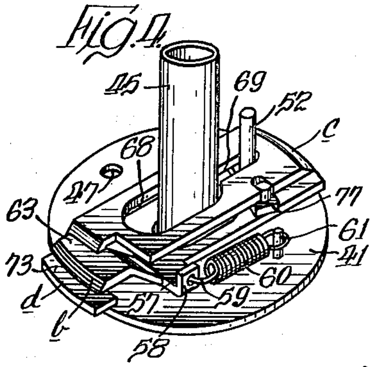
Fig. 4 is a perspective view of the adapter record release mechanism operatively assembled but without the enclosing housing therefor.
Figure 5:
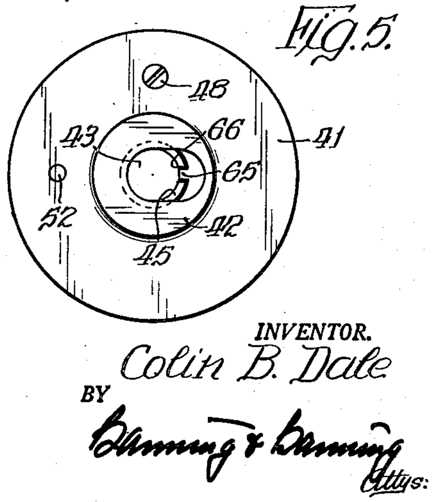
Fig. 5 is a bottom plan view of the upper adapter unit.

Referring now to Figure 2, the adapter comprises upper and lower units A and B, the former being applied to the pilot 10 at the spindle top and the latter being rested upon the turntable T. The lower unit adapter B serves as a centering medium to assure retention of each record, when in playing position, in concentricity with the turntable. Such a centering unit comprises a base 35 in the form of a thin circular disc having a center hole 36 of a size to freely receive a small diameter spindle S and be maintained coaxially therewith when rested upon the turntable T. Affixed to this base coaxially thereof is a cylindrical dome 38 whose side walls $x$ rise straight from the base and then curve inwardly at $y$ in the upper region to leave at the top an opening 39. The outside diameter of the dome walls $x$ is very slightly less than is the diameter of the oversize holes in the records R' to be accommodated thereon. As indicated clearly in Figure 2, records as released one at a time to the turntable will descend by gravity along the spindle S to be guided by the dome walls *x* and *y* to a position of rest upon the base disc 35 (or upon the topmost record that is then resting thereupon). When so disposed, the record last released will be held in the correct playing position concentrically with respect to the turntable so as to be rotated thereby.

The upper adapter unit A comprises a circular base plate 41 having a central depending boss 42 through which is an elongated diametrical slot 43 disposed unequally on opposite sides of center. Extending upwardly from the base plate and affixed thereto is a tubular post 45 which is coaxial with one rounded end of the slot 43. A dome-shaped housing 46 in the form of a block, made desirably of plastic material or the like, rises from the base plate through which is a hole 47 for entry of a screw 48 which engages the housing, thereby to join the one fixedly to the other. This housing is rounded over at the top where it meets flush with the upper end of the tubular post 45. The diameter of this housing is substantially the same as that of the lower adapter unit B so as to accommodate freely thereon reserve records R' having oversize holes.

Adjacent its base the housing 46 is recessed to provide a wide chamber 50 (see Fig. 7) extending diametrically thereacross. This chamber is closed on all sides, except only at its opposite ends, when the base plate 41 is secured in place thereto. The chamber is laterally enlarged on one side to provide a recess 51 for the accommodation of certain of the working parts as will presently be described.

Two elongated slide plate supports X and Y are positioned, one on top of the other, within the chamber 50 at the base of the housing. The length of each plate is slightly greater than is the diameter of the base plate 41. Opposite ends of each slide plate are arcuately formed in general conformity with the curvature of the base plate, and one arcuate end of each plate is normally protruded slightly outwardly beyond the confines of the base plate while its other end remains substantially flush therewith.

The lower slide plate support Y is formed in its body with an elongated slot 55 so that the plate may straddle the tubular post 45, when assembled therewith. A relatively narrow slot 56 is extended from the body slot 55 toward one slide end designated as *a*, to receive therethrough an upstanding pin 52 which is anchored to the base plate 41. This pin is accommodated in the housing within a socket that is formed for its reception. An arm 57 extends laterally from one side of the plate and terminates in an upstanding finger 58 through which is a hole for receiving the hooked end 59 of a coiled spring 60 whose opposite end is connected to an anchor pin 61 (see Fig. 7). The arm-spring assembly is accommodated within the recess 51 that is formed laterally of the chamber 50.

The arm 57 is disposed near the opposite plate end *b* in the region of a side recess which defines a neck 62 that is inclined upwardly and then extended horizontally to support a head 63 constituting the plate end *b*. This head is disposed at an upper lever in offset relation to the body of the slide plate Y. The transverse width of the neck 62 is substantially half that of the plate, and the extent of offset of the head, as herein illustrated, is approximately three times the thickness of the slide plate Y.

At the end of the elongated slot 55 toward the neck 62 is a lug 65 which is adapted to enter a slot 66 at the base of the tubular post 45. The normal rest position of the slide plate Y is as shown in Figure 6 where its arcuate end *a* is protruded outwardly slightly beyond the confines of the base plate 41. The opposite end *b* of the slide plate which is beveled on its top face is normally disposed substantially flush with the proximate face of the housing 46 of the adapter unit.

The upper slide plate support X is complementary to the slide Y just described. Its length and width are substantially the same, and it is provided in its body with an elongated slot 68 from which a narrow tail slot 69 is extended toward one of its arcuate ends *c*. There is also formed in the plate toward its opposite end a large slot which extends inwardly from one side for approximately half the width of the plate to define a neck 72 which joins with a head 73 constituting the plate end *d*. This neck is inclined downwardly and then extended horizontally so that the head 73 supported thereby is offset at a lower plane by a distance which, as shown, is approximately three times the thickness of the slide plate X. The end *d* of the upper plate X underlies the end *b* of the lower plate Y with a substantial space therebetween. The two necks 62 and 72 are disposed side by side, and oppositely inclined so as to cross each other. The arcuate end *c* of the upper slide plate X is beveled on its top face to correspond with the arcuate bevel at the end *b* of the lower slide plate Y.

Means is provided to interconnect the two slide plate supports for concurrent movement, but in opposite directions. For this purpose I have shown a cross bar 75 having a center hole 76 traversed by the pin 52 which provides a pivotal mounting therefor. A stud 77 also upstands from the plate near one end thereof and a second stud 78 depends from the plate near its opposite end (see Fig. 11). A slot 80 extended into the lower slide plate Y from one side thereof at a point oppositely of its narrow slot is adapted to receive the depending stud 78. A corresponding slot 81 is formed in the upper slide plate X to receive the upstanding stud 77. Since the cross bar is pivotally mounted intermediately of its two end studs, any sliding movement of either plate will transmit to the other plate a corresponding motion equal in distance but in the opposite direction. The spring 60 is effective to hold the lower slide plate Y in the normal rest position of Fig. 6, and the cross bar 75 assures that the upper plate X will occupy the normal rest position that is shown in the same figure. Here it will be observed also that the arcuate end *d* of the upper slide plate is protruded slightly beyond the confines of the base plate 41, whereas its opposite beveled end *c* is disposed substantially flush with the proximate face of the housing block 46.

When the adapter unit A is fitted onto the spindle pilot 10, the elongated slot 43 in its boss 42 will receive the spindle shoulder 12, but only when the adapter is in the one correct rotative position for this purpose. When so disposed, the rocking movements of the push-off head 20 will proceed longitudinally of the elongated slot 43, and the lower end of the tubular post 45 will be engaged with the shoulder 12 so as to sustain the adapter unit in a fixed position upon the spindle. The arcuate end *a* of the lower slide plate Y and the arcuate end *d* of the upper slide plate X, both lying in the same plane, will then underlie the center portion of the lowermost reserve record R′ when placed in a position of rest upon the adapter unit A. In this position the reserve record and all others stacked thereabove will be supported on diametrically opposite sides of the adapter unit by the colevel ends *a* and *d* of the two slide plates.

With commencement of the record changing operation, the push-off head 20 of the lever L will advance upwardly and then laterally through the slot 66 at the base of the tubular post 45 to engage the lug 65 of the lower slide plate Y. In the movement which ensues, the lower slide plate is shifted crosswise of the adapter unit A so that its trailing arcuate end *a* is moved to a position within the confines of the housing 46. In so doing, this end of the slide plate Y withdraws from supporting engagement with the underface of the lowermost reserve record R′. At the same time, because of the interconnection afforded by the cross bar 75, the arcuate end *d* of the upper slide plate X which protrudes from the opposite side of the adapter unit is concurrently retracted to withdraw from supporting engagement with the lowermost reserve record R′ at the point which is diametrically opposite the arcuate end *a* of the lower slide plate Y. This lowermost record R′ is thereupon deprived of further support so that it is free for gravity descent along the spindle S to playing position upon the turntable T.

As the arcuate end *a* of the lower slide plate Y withdraws to a position within the confines of the adapter unit, its opposite end *b* at the upper lever is advanced an equal distance outwardly beyond the opposite side of the adapter unit. The elevated position of the end *b* of the lower slide plate is such that it lies oppositely of the next to the lowermost reserve record R′. Accordingly, this arcuate end *b*, which is beveled on its top face and disposed oppositely of the record next to the lowermost, is advanced outwardly into supporting engagement therewith. Concurrently the arcuate end *c* of the upper slide plate X, also beveled on its upper face and disposed at an upper level oppositely of the arcuate end *b* of the lower slide plate Y, is advanced outwardly into supporting engagement with the record R′ that is next to the lowermost. As a result, when the lowermost record R′ is released, a supporting engagement is afforded concurrently to the record next thereabove so that this reserve record and all others stacked thereon will be prevented from dropping down onto the turntable.

The rocking movement of the lever L in one direction is responsible for the opposite movement of the two slide plate supports X and Y to effect a release of the lowermost record and concurrently a detention of the remaining reserve records. When the rocking lever L swings back to its normal position, the two slide plates will also return to their positions of rest under the influence of the coil spring 60. In so doing, the arcuate ends *c* and *b* at the upper level withdraw their support from the reserve record in engagement therewith, but the arcuate ends *a* and *d* at the lower level will concurrently advance outwardly to engaging position so as to arrest gravity descent of the reserve record when it has dropped through a distance substantially equal to its own thickness.

By the means described I provide for the release of but a single reserve record at a time, and for limiting downward movement of all reserve records thereabove to a distance substantially equal to the thickness of a single record. This is accomplished by the simple act of placing the adapter unit in the correct rotative position upon the spindle S so that the base of the tubular post 45 is rested upon the supporting shoulder 12. There are no connections to be made in order to establish operative relationship between the record release mechanism which is built into the spindle and the corresponding mechanism which is incorporated in the adapter unit A. The one transmits motion to the other so as to accomplish with records having oversize holes exactly what was intended to be accomplished, before my invention of the present adapter, when records having small holes are placed upon the conventional small diameter spindle. If and when it is desired to utilize records having the small size center holes, all that need be done is to lift the two adapter units A and B off of the spindle, thus clearing it for operation in the manner originally intended.

I claim:

1. For use with a phonograph having a rotatable turntable and coaxially thereof an upstanding spindle of relatively small diameter provided intermediate its ends at one side thereof with a shoulder to support a stack of reserve records having center holes of correspondingly small diameter, said spindle mounting within itself a head movable radially of the spindle to push off the reserve record resting on the shoulder, an adapter having a cylindrical housing for receiving and centering, with respect to the portion of the spindle above the shoulder, a stack of reserve records having relatively large diameter center holes, said housing having an axial opening for receiving the portion of the spindle above the shoulder and being seated in a fixed position on the spindle, a pair of elongated horizontal slide plates of equal length arranged with the body of one disposed above that of the other, means providing a mounting for the two plates to permit movement thereof transversely of the housing at a point adjacent its base, each slide plate being slightly longer than is the housing diameter whereby one end of each plate remains protruded outwardly therefrom when the other end is flush therewith, means interconnecting the slide plates for equal and opposite concurrent movements to compel one end of the lower plate to protrude beyond the confines of the housing when the opposite end of the upper plate is similarly protruded, and vice versa, the two slide plates in adjacent end portions being inclined oppositely out of the horizontal whereby to position the proximate end of each plate at a level oppositely of the body of the other plate, the lower slide plate, when protruded at one end beyond the housing, acting through the interconnecting means to compel the opposite end of the upper slide plate to be similarly protruded, the protruded ends of the slide plates at the lower level being located just under the lowermost reserve record, when positioned on the housing, to afford a releasable support therefor and the position of the slide plate ends at the upper level being just under the next higher reserve record to afford a releasable support therefor, the lower slide plate body having means lying in the path of the push-off head of the record release mechanism and engageable thereby to be operated therefrom whereby to permit a gravity seriatim release of the reserve records on the adapter housing.

2. For use with a phonograph having a rotatable turntable and coaxially thereof an upstanding spindle of relatively small diameter provided intermediate its ends at one side thereof with a shoulder to support a stack of reserve records having center holes of correspondingly small diameter, said spindle mounting within itself a head movable radially of the spindle to push off the reserve record resting on the shoulder, an adapter having a cylindrical housing for receiving and centering, with respect to the portion of the spindle above the shoulder, a stack of reserve records having relatively large diameter center holes, said housing having an axial opening for receiving the portion of the spindle above the shoulder and being seated in a fixed position on the spindle, a pair of elongated horizontal slide plates arranged with the body of one disposed above that of the other, means providing a mounting for the two plates to permit movement thereof transversely of the housing at a point adjacent its base, each slide plate being slightly longer than is the housing diameter whereby one end of each plate is advanced outwardly therefrom when the other end remains inwardly thereof, means interconnecting the slide plates for opposite concurrent movements to compel one end of the lower plate to protrude beyond the confines of the housing when the opposite end of the upper plate is similarly protruded, and vice versa, the two slide plates in adjacent end portions being inclined oppositely out of the horizontal whereby to position the proximate end of each plate at a level oppositely of the body of the other plate, the lower slide plate, when protruded at one end beyond the housing, acting through the interconnecting means to compel the opposite end of the upper slide plate to be similarly protruded, the protruded ends of the slide plates at the lower level being located just under the lowermost reserve record, when positioned on the housing, to afford a releasable support therefor and the position of the slide plate ends at the upper level being just under the next higher reserve record to afford a releasable support therefor, the lower slide plate body having means lying in the path of the push-off head of the record release mechanism and engageable thereby to be operated therefrom whereby to permit a gravity seriatim release of the reserve records on the adapter housing.

3. For use with a phonograph having a rotatable turntable and coaxially thereof an upstanding spindle of relatively small diameter provided intermediate its ends at one side thereof with a shoulder to support a stack of reserve records having center holes of correspondingly small diameter, said spindle mounting within itself a head movable radially of the spindle to push off the reserve record resting on the shoulder, an adapter having a cylindrical housing for receiving and centering, with respect to the portion of the spindle above the shoulder, a stack of reserve records having relatively large diameter center holes, said housing having an axial opening for receiving the portion of the spindle above the shoulder and being seated in a fixed position on the spindle, a pair of elongated slide plates arranged one above the other and each extended transversely within the housing adjacent its base with an end portion of one plate arranged above the corresponding end portion of the other plate and the opposite end portions of the two plates reversely arranged, a cross bar pivoted intermediately of its ends and in sliding pivotal connection with the two slide plates to compel opposite concurrent movements thereof, a spring in connection with one slide plate and exerting a force urging it to a position of rest wherein one of its ends is flush with one side of the housing and its other end is protruded to a supporting position beyond the opposite side thereof, the other slide plate being concurrently operated to its rest position in which one end is protruded from the housing to a supporting position at the side thereof when the corresponding end of the first-named slide plate is flush therewith, the ends of the two plates so protruded concurrently to supporting positions being disposed at the same level, and means on one of the slide plates engageable by the push-off head of the record release mechanism and arranged to be operated thereby to effect movement of both slide plates whereby to retract the colevel ends thereof inwardly from supporting positions concurrently with advance of the opposite colevel ends thereof outwardly from the housing to supporting positions at a second level.

4. For use with a phonograph having a rotatable turntable from which axially upstands a spindle of relatively small diameter formed in its top portion with an offset pilot having at its base a shoulder whereon to support a stack of reserve records with center holes, and from which supporting shoulder each lowermost record, when shifted laterally, is freed for gravity descent along the spindle, the spindle mounting within itself a record release mechanism comprising a push-off head laterally movable within the center hole of the lowermost record for engagement therewith to effect a lateral shifting thereof and displacement of the record off of the supporting shoulder to permit gravity descent of such record along the spindle to playing position upon the turntable, an adapter for centering and releasably supporting reserve records with oversize center holes relative to the small diameter spindle comprising a generally cylindrical housing having a central vertical opening, a tubular post fixedly secured within the housing opening for receiving therewithin the spindle pilot and arranged at its lower end to engage the spindle shoulder thereby to be supported in a fixed position horizontally upon the spindle, a base plate affixed to the housing and post and having a center opening communicating with the post interior and extended to one side of center to provide an elongated recess for accommodation at one of its ends of the shouldered portion of the spindle when the housing is in the requisite rotative position for this purpose thereby to maintain the housing fixedly in such rotative position, a pair of elongated horizontal slide plates of equal length arranged with the body of one disposed above that of the other, there being in each plate body an elongated slot through which the post is extended to provide guide means for sliding movements of each plate transversely of the housing adjacent the base plate, each slide plate being slightly longer than is the housing diameter whereby one end of each plate remains protruded outwardly therefrom when the other end is flush therewith, means interconnecting the slide plates for equal and opposite concurrent movements to compel one end of the lower plate to protrude outwardly beyond the confines of the housing when the opposite end of the upper plate is similarly protruded, and vice versa, the two slide plates in adjacent end portions being inclined oppositely out of the horizontal whereby to position the proximate end of each plate at a level oppositely of the body of the other plate, the lower slide plate, when protruded at one end beyond the housing, acting through the interconnecting means to compel the opposite end of the upper slide plate to be similarly protruded, the protruded ends of the slide plates at the lower level being located just under the lowermost reserve record, when positioned on the housing, to afford a releasable support therefor and the position of the slide plate ends at the upper level being just under the next higher reserve record to afford a releasable support therefor, the lower slide plate body having means lying in the path of the push-off head of the record release mechanism and engageable thereby to be operated therefrom whereby to permit a seriatim gravity release of reserve records on the adapter housing.

5. For use with a phonograph having a rotatable turntable from which axially upstands a spindle of relatively small diameter formed in its top portion with an offset pilot having at its base a shoulder whereon to support a stack of reserve records with center holes, and from which supporting shoulder each lowermost record, when shifted laterally, is freed for gravity descent along the spindle, the spindle mounting within itself a record release mechanism comprising a push-off head laterally movable within the center hole of the lowermost record for engagement therewith to effect a lateral shifting thereof and displacement of the record off of the supporting shoulder to permit gravity descent of such record along the spindle to playing position upon the turntable, an adapter for centering and releasably supporting reserve records with oversize center holes relative to the small diameter spindle comprising a generally cylindrical housing having a central vertical opening, a tubular post fixedly secured within the housing opening for receiving therewithin the spindle pilot and arranged at its lower end to engage the spindle shoulder thereby to be supported in a fixed position horizontally upon the spindle, a base plate affixed to the housing and post and having a center opening communicating with the post interior and extended to one side of center to provide an elongated recess for accommodation at one of its ends of the shouldered portion of the spindle when the housing is in the requisite rotative position for this purpose thereby to maintain the housing fixedly in such rotative position, a pair of elongated horizontal slide plates of equal length arranged with the body of one disposed above that of the other, there being in each plate body an elongated slot through which the post is extended to provide guide means for sliding movements of each plate transversely of the housing adjacent the base plate, each slide plate being slightly longer than is the housing diameter whereby one end of each plate remains protruded outwardly therefrom when the other end is flush therewith, a cross bar extending between the two slide plates and in connection with each, a pivotal mounting for the cross bar centrally between its connections with the slide plates to compel equal and opposite concurrent sliding movements thereof whereby one end of the lower plate is protruded outwardly beyond the confines of the housing when the opposite end of the upper plate is similarly protruded, and vice versa, the two slide plates in adjacent end portions being inclined oppositely out of the horizontal whereby to position the proximate end of each plate at a level oppositely of the body of the other plate, the lower slide plate, when protruded at one end beyond the housing, acting through the interconnecting means to compel the opposite end of the upper slide plate to be similarly protruded, the protruded ends of the slide plates at the lower level being located just under the lowermost reserve record, when positioned on the housing, to afford a releasable support therefor and the position of the slide plate ends at the upper level being just under the next higher reserve record to afford a releasable support therefor, the lower slide plate body having means lying in the path of the push-off head of the record release mechanism and engageable thereby to be operated therefrom whereby to permit a seriatim gravity release of reserve records on the adapter housing.

6. For use with a phonograph having a rotatable turntable and coaxially thereof an upstanding spindle of relatively small diameter provided intermediate its ends at one side thereof with a shoulder to support a stack of reserve records having center holes of correspondingly small diameter, said spindle mounting within itself a push-off head movable radially of the spindle to displace the reserve record resting on the shoulder, an adapter having a cylindrical housing for receiving and centering, with respect to the portion of the spindle above the shoulder, a stack of reserve records having relatively large diameter center holes, said housing having an axial opening for receiving the portion of the spindle above the shoulder and being seated on the spindle and freely detachable therefrom, a pair of upper supports and a pair of lower supports each having a record-engaging portion and both pairs of supports interlinked for concurrent operation in response to engagement of the push-off head when advanced radially of the spindle, the two pairs of supports being mounted in the housing for movement transversely of the housing axis between positions wherein a record-engaging portion of each support in one pair is protruded outwardly beyond the confines of the housing while the record-engaging portion of each support in the other pair is withdrawn inwardly within the confines of the housing, and vice-versa, thereby to permit a seriatim gravity release of the reserve records so received and centered with respect to the housing, and a spring normally urging one pair of supports to one of the two positions aforesaid.

COLIN B. DALE.

References Cited in the file of this patent

UNITED STATES PATENTS

| Number | Name | Date |
|---|---|---|
| 1,568,120 | Blackwell ---------- | Jan. 5, 1926 |